(12) United States Patent
Call

(10) Patent No.: US 11,943,520 B2
(45) Date of Patent: Mar. 26, 2024

(54) PROTECTED BACK-UP CAMERA FOR VEHICLES

(71) Applicant: Brad Call, Freedom, WY (US)

(72) Inventor: Brad Call, Freedom, WY (US)

(*) Notice: Subject to any disclaimer, the term of this patent is extended or adjusted under 35 U.S.C. 154(b) by 0 days.

(21) Appl. No.: 15/081,477

(22) Filed: Mar. 25, 2016

(65) Prior Publication Data

US 2017/0274823 A1  Sep. 28, 2017

(51) Int. Cl.
| | |
|---|---|
| *H04N 23/51* | (2023.01) |
| *B60R 11/04* | (2006.01) |
| *B60S 1/56* | (2006.01) |
| *G02B 27/00* | (2006.01) |
| *G03B 11/04* | (2021.01) |
| *H04N 23/55* | (2023.01) |
| *H04N 23/81* | (2023.01) |
| *G03B 17/55* | (2021.01) |

(52) U.S. Cl.
CPC ............ *H04N 23/51* (2023.01); *B60R 11/04* (2013.01); *B60S 1/56* (2013.01); *G02B 27/0006* (2013.01); *G03B 11/045* (2013.01); *H04N 23/55* (2023.01); *H04N 23/811* (2023.01); *G03B 17/55* (2013.01)

(58) Field of Classification Search
CPC ......... B60R 11/04; B60S 1/56; G02B 27/006; G03B 11/045; G03B 17/55
USPC ....................................................... 348/148
See application file for complete search history.

(56) References Cited

U.S. PATENT DOCUMENTS

| | | | | |
|---|---|---|---|---|
| 2003/0155001 A1* | 8/2003 | Hoetzer | ................ | B60S 1/0822 134/52 |
| 2004/0263666 A1* | 12/2004 | Tsuji | .................... | H04N 5/2254 348/335 |
| 2008/0012982 A1* | 1/2008 | Hsueh | ................ | G02B 27/0006 359/511 |
| 2009/0041452 A1* | 2/2009 | Yoneji | ..................... | B60R 11/04 396/535 |
| 2012/0243093 A1* | 9/2012 | Tonar | .................. | H01L 41/0973 359/507 |
| 2013/0028588 A1* | 1/2013 | Suman | ................... | G03B 17/00 396/448 |
| 2013/0209079 A1* | 8/2013 | Alexander | .............. | B60S 1/566 396/25 |
| 2014/0320654 A1* | 10/2014 | Dadeppo | ............ | G02B 27/0006 348/148 |
| 2015/0172520 A1* | 6/2015 | Lindman | .............. | G08B 29/046 382/190 |
| 2015/0296108 A1* | 10/2015 | Hayakawa | ............. | G03B 17/08 348/148 |
| 2015/0358509 A1* | 12/2015 | Austin | ................. | H04N 5/2252 348/148 |
| 2016/0016678 A1* | 1/2016 | Bullard | .................... | B64G 1/54 244/171.7 |
| 2016/0304029 A1* | 10/2016 | Villanueva | ............. | H04N 23/51 |
| 2017/0244873 A1* | 8/2017 | Izabel | .................... | H04N 7/183 |

* cited by examiner

*Primary Examiner* — Joseph G Ustaris
*Assistant Examiner* — Jimmy S Lee
(74) *Attorney, Agent, or Firm* — Dax D. Anderson; Kirton McConkie

(57) ABSTRACT

A back-up camera for a vehicle incorporating a hood, a cover, nozzles for squirting water and air onto the surface of the camera lens, and an heating element for melting ice which accumulates on the lens.

12 Claims, 2 Drawing Sheets

PROTECTED BACK-UP CAMERA FOR VEHICLES

CROSS-REFERENCE TO RELATED APPLICATIONS

Not applicable.

BACKGROUND OF THE INVENTION

Back-up cameras currently exist for some vehicles, but they are usually exposed to the elements and therefor can fog-up, get dirty and get wet thereby distorting the picture the camera transmits to the on-board monitor. Glare from the sun may also distort the picture.

BRIEF SUMMARY OF THE INVENTION

The present invention provides embodiments which protect a back-up camera lens from environmental elements that distort the picture provided to the on-board monitor. These environmental elements can affect the lens when it is in use such as backing up in the snow or rain with precipitation attaching to the lens, glare from the sun distorting the picture or the lens having a frozen surface. Elements also affect the camera when it is not in use such as accumulating snow and rain that dries on the lens, dust build-up and scratching from the sand blasting effect of wind-driven sand. Some embodiments such as the cover protect the lens when not in use, other embodiments such as the hood, squirters and heater remediate the exposure of the lens to the elements by washing, drying, warming or shielding the lens. It will be understood that all of these features may be present in some embodiments, including embodiments with the cover.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Figure 1:
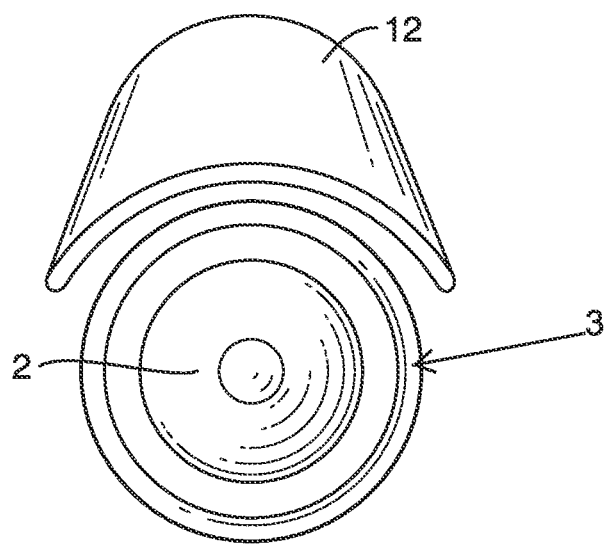
FIG. 1 depicts a back-up camera with a sun shielding hood.

FIG. 1 depicts a vehicle back-up camera 2 protected from glare by a sun shield 124. While shield 12 is shown fixed in a position above a lens, some embodiments utilize a gimbal or circular track to allow movement of shield 12 to a position to either side of the lens if the sun is lower in the sky. Shield 12 may also be pivoted to be below the lens in situations where the sun is reflected off of snow or water. This embodiment is especially desirable when using the back-up camera to aid in attaching a trailer or driving a trailer into the water under a boat.

Shield 12 also protects the lens from rain and snow accumulation, thereby keeping the lens dry so that it is clear when activated.

Figure 2:
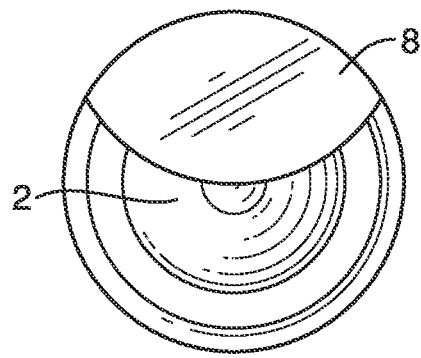
FIG. 2 depicts a camera lens with an enclosing cover partially deployed.
Figure 3:
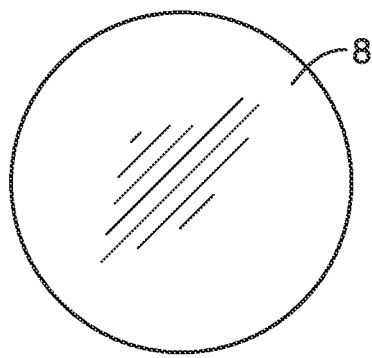
FIG. 3 depicts a camera lens with an enclosing cover fully deployed.

FIG. 2 illustrates an embodiment of the present invention utilizing a protective cover 8 that functions like an eyelid. Cover 8 pivots about a horizontal axis and is usually in a closed position covering the lens and shielding the lens from contact with elements. FIG. 2 shows cover 8 in a semi-closed position and FIG. 3 shows the cover in the fully closed position. Cover 8 is activated simultaneously with the camera to quickly uncover the lens. When cover 8 is closed, it protects the lens from dust, rain and snow and other elements that might distort or impact the picture sent an on-board monitor (not shown). Cover 8 may have incorporated therein a hood so that when cover 8 is withdrawn, a hood attached to the edge of cover 8 rotates into a position above the lens. It will be appreciated that a permanent shield could also be used with or in place of the hood. When a heavy snow has fallen and accumulated on a bumper or other vehicular structure that would otherwise come into contact with the lens when cover 8 is activated, the hood may provide a scooping action to brush accumulated debris or snow away from the lens as cover 8 is retracted.

Figure 4:
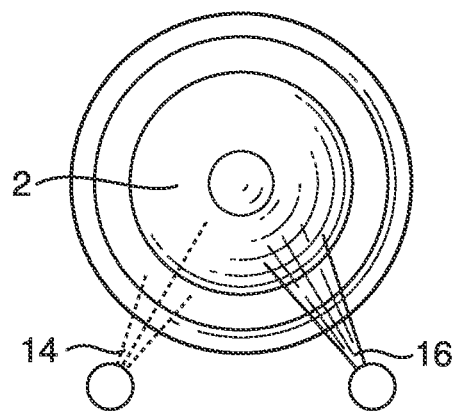
FIG. 4 depicts a camera lens with a water squirter and an air squirter.

FIG. 4 shows the lens with a water nozzle 14 located in a position where water can be directed onto the surface of the lens. An air nozzle 16 is likewise positioned to allow air to be directed over the surface of the lens-g. In some embodiments, water is squirted through nozzle 14 and thereafter, air is squirted through nozzle 16 to dry the lens. If dust has accumulated, then a user may elect to use only nozzle 16 to blow off the lens. It will be appreciated that the cleaning system incorporating nozzles 14 and 16 may be employed in addition to any other features used in other embodiments of the present invention.

Figure 5:
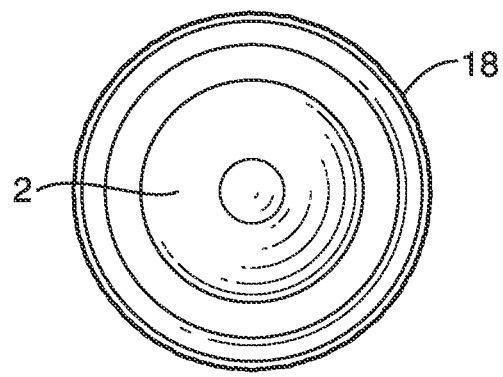
FIG. 5 depicts a camera lends with a heating element surrounding the edges and back of the lens.

FIG. 5 shows an embodiment with a heating element 18. Heating element 18 may be positioned so as to encircle the lens, or be placed to heat the back of the lens, or both. In icy conditions, water may freeze onto the surface of the lens. Heating element 18 will melt the ice and either dry the moisture or if nozzle 16 is incorporated into the embodiment, the melted ice may be blown off of the lens by nozzle 16.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A protected back-up camera for use on a vehicle, said camera comprising:

a lens configured to receive sunlight in order to capture moving images for transmission to an on-board monitor of the vehicle;

a circular track circumscribing the lens;

a curved shield coupled to the circular track and configured to articulate along the circular track to selectively block a portion of the sunlight which is coming from a specific direction (without blocking the sunlight entirely) to shield a surface of the lens from a glare caused by the sunlight, whereby the shield and the circular track are adapted to permit the shield to be selectively disposed below the lens to block reflected light off of snow or water, wherein a curvature of the shield substantially aligns with a curvature of the lens, and wherein the shield is also configured to protect the lens from rain and snow accumulation without blocking a field of view of the lens; and a lens cover system comprising:
  a cover configured to articulate along a path substantially parallel the lens wherein a leading edge of the cover is configured to cross in front of the lens and nest into a non-articulating edge of a camera housing so as to entirely enclose the lens behind the cover; and
  a hood mounted above said lens for protecting said lens from sun and dust to keep the lens dry allowing the lens to be used uncovered while still protected from the glare or elements when backing or viewing, wherein the hood is attached to an edge of the cover, such that when the cover retracts the hood rotates into a position above the lens, and the hood is configured to provide a scooping action to brush accumulated debris or snow away from the lens as the cover is retracted.

2. The camera of claim 1, wherein said shield rotationally pivots to block elements from impacting said lens from the side.

3. The camera of claim 1, further comprising a cleaning system that comprises:
  a water nozzle located below the lens to direct a short stream of water upwardly onto the surface of the lens to clean the lens; and
  an air nozzle disposed proximate to the water nozzle and configured to direct a stream of air onto the surface of the lens after the water nozzle directs the short stream of water onto the surface of the lens.

4. The camera of claim 1, further comprising an air nozzle to direct a stream of air onto the surface of the lens to dry a wet lens.

5. The camera of claim 1, further comprising a heating element to melt ice off of the surface of the lens.

6. A protected back-up camera for use on a vehicle, said camera comprising:
  a lens configured to receive sunlight in order to capture moving images for transmission to an on-board monitor of the vehicle;
  a circular track circumscribing the lens on which is disposed a curved shield, whereby the shield and the circular track are adapted to permit the shield to be selectively disposed above, below, and to the side of the lens to block a portion of the sunlight coming from a specific direction (without blocking the sunlight entirely) to reduce a glare on a surface of the lens, wherein a curvature of the shield substantially aligns with a curvature of the lens, and wherein the shield is configured to protect the lens from rain and accumulating snow without blocking a field of view of the lens;
  a unitary eyelid-like disk-shaped cover configured to fully retract along a substantially linear path into the body of the vehicle to protect said lens from contact by elements wherein the edge of the unitary eyelid-like disk-shaped cover is shaped to nest against a non-articulating camera housing, wherein the unitary eyelid-like disk-shaped cover comprises a hood attached to an edge of the unitary eyelid-like disk-shaped cover, such that when the cover retracts the hood rotates into a position above the lens, and the hood is configured to provide a scooping action to brush accumulated debris or snow away from the lens as the cover is retracted; and
  a cleaning system that comprises:
    a water nozzle located below the lens to direct a short stream of water upwardly onto the surface of the lens to clean the lens; and
    an air nozzle configured to direct a stream of air onto the surface of the lens after the water nozzle cleans the lens.

7. The camera of claim 6, wherein said hood is configured to rotate around the lens to selectively protect the lens.

8. The camera of claim 6, further comprising a heating element to melt ice off of the surface of the lens.

9. The camera of claim 1, wherein said hood is configured to selectively articulate to protectively shield the lens.

10. A method for operating a lens of a camera of a vehicle comprising:
  exposing the lens to sunlight in order to capture visual information for transmission to an on-board monitor of the vehicle;
  selectively rotating a curved shield disposed in a circular track circumscribing the lens and coupled to a body of the vehicle to selectively shield the camera lens from a portion of the sunlight coming from a specific direction causing a glare on a surface of the lens, and to selectively shield the lens from rain and accumulating snow without blocking a field of view of the lens, wherein the portion of the sunlight causing the glare is reflected off of snow or water below the camera lens, and wherein a curvature of the shield substantially aligns with a curvature of the lens;
  protecting the camera lens with a cover having a rounded edge configured to nest with a side of a lens housing when the cover is closed and configured to pivot about a horizontal axis, wherein the cover is configured to selectively and quickly open and close to allow for image capture without leaving the lens unnecessarily exposed, and wherein the cover is configured to provide a scooping action to brush accumulated debris away from blocking the camera lens when the cover retracts.

11. The method of claim 10, wherein the cover incorporates an additional hood that provides the scooping action to brush accumulated debris away from blocking the camera lens when the cover retracts.

12. The method as recited in of claim 10, further comprising:
  opening the cover protecting the camera lens;
  directing water over the camera lens from a water nozzle; and
  directing air over the camera lens from an air nozzle after the water has been directed over the camera lens.

* * * * *